United States Patent
Yamada et al.

(10) Patent No.: US 12,512,776 B2
(45) Date of Patent: Dec. 30, 2025

(54) CONTROL DEVICE AND COMMUNICATION METHOD IN CONTROL DEVICE

(71) Applicant: MITSUBA Corporation, Gunma (JP)

(72) Inventors: Miya Yamada, Gunma (JP); Kota Fukashiro, Gunma (JP)

(73) Assignee: MITSUBA Corporation, Gunma (JP)

( * ) Notice: Subject to any disclaimer, the term of this patent is extended or adjusted under 35 U.S.C. 154(b) by 224 days.

(21) Appl. No.: 18/540,836

(22) Filed: Dec. 14, 2023

(65) Prior Publication Data
US 2024/0305231 A1    Sep. 12, 2024

(30) Foreign Application Priority Data

Mar. 8, 2023    (JP) .................. 2023-035161

(51) Int. Cl.
H02P 23/28    (2016.01)
H02K 11/33    (2016.01)
H02K 11/35    (2016.01)
H02P 27/06    (2006.01)

(52) U.S. Cl.
CPC .............. *H02P 23/28* (2016.02); *H02K 11/33* (2016.01); *H02K 11/35* (2016.01); *H02P 27/06* (2013.01)

(58) Field of Classification Search
CPC .... G06F 11/0796; G06F 15/7807; G06F 1/14; G06F 11/2023; G06F 11/30; G06F 15/7814; G06F 18/20; G06F 11/0739; G06F 18/2178; G01M 13/028; G01M 13/045; H02K 11/33; H02K 11/35; H02P 23/28; H02P 27/06; G01H 3/08; G01H 17/00; G05B 23/0221; G05B 23/0289; G05B 23/0291; G05B 19/042; G05B 2219/37337
USPC ............. 340/3.43, 507, 870.16, 500, 538.12, 340/12.34, 7.23, 2.26
See application file for complete search history.

(56) References Cited

U.S. PATENT DOCUMENTS

2022/0416695 A1*    12/2022    Wu ................. G08B 21/187

FOREIGN PATENT DOCUMENTS

JP    2014089672    5/2014

* cited by examiner

*Primary Examiner* — Antony M Paul
(74) *Attorney, Agent, or Firm* — JCIPRNET

(57) ABSTRACT

A motor control device includes an MCU and a predriver configuring at least a part of a circuit for controlling driving of a motor. The MCU includes a communication timing judgment portion, outputting a communication verification command when a diagnostic signal including information indicating whether the mechanism or equipment to be controlled by a combination of the MCU and the predriver is in a fail state is input from the predriver to the MCU; a signal content judgment portion, judging whether a content of the diagnostic signal is in the fail state when the communication verification command is input and outputting a communication execution command when the content of the diagnostic signal indicates the fail state; and a communication portion, executing a communication between the MCU and the predriver for reading fail information of the predriver when the communication execution command is input.

4 Claims, 3 Drawing Sheets

CONTROL DEVICE AND COMMUNICATION METHOD IN CONTROL DEVICE

CROSS-REFERENCE TO RELATED APPLICATION

This application claims the priority benefits of Japanese application no. 2023-035161, filed on Mar. 8, 2023. The entirety of the above-mentioned patent application is hereby incorporated by reference herein and made a part of this specification.

BACKGROUND

Technical Field

The disclosure relates to a control device and a communication method in a control device.

Description of Related Art

In a motor driving system with an MCU (micro controller unit) and IC (integrated circuit) on the same system, the MCU and IC periodically execute communication (specifically, for example, SPI (serial peripheral interface) communication), for example, to write IC settings and read IC fail information (see, for example, Patent Document 1 (Japanese Patent Application Laid-Open (JP-A) No. 2014-89672)).

Meanwhile, noise oscillation occurs during communication, and depending on the frequency and conditions of the occurrence of noise oscillation, the noise oscillation accompanying communication may cause electromagnetic interference. This poses a problem in that electronic devices may have many harmful consequences, such as malfunctions, reduced functionality, loss of data, and safety risks.

Accordingly, one aspect of the disclosure is to provide a technology that may reduce noise oscillations caused by communication on the same system.

SUMMARY

The control device of the disclosure includes an MCU and an IC. The MCU may include: a communication timing judgment portion, outputting a communication verification command when a signal including information indicating whether an object to be controlled by a combination of the MCU and the IC is in a fail state is input from the IC to the MCU; a signal content judgment portion, judging whether a content of the signal is in the fail state when the communication verification command is input and outputting a communication execution command when the content of the signal indicates the fail state; and a communication portion, executing a communication between the MCU and the IC for reading fail information of the IC when the communication execution command is input.

The control device according to the disclosure may be configured such that the MCU and the IC configure at least a part of a circuit for controlling driving of a motor.

A communication method in a control device according to the disclosure is a method executed by a control device including an MCU and an IC, the method may include: a step of judging whether a content of a signal is in a fail state when the signal is input from the IC to the MCU, where the signal includes information indicating whether an object to be controlled by a combination of the MCU and the IC is in a fail state; and a step of executing a communication between the MCU and the IC for reading fail information of the IC when the content of the signal indicates the fail state.

The communication method in the control device according to the disclosure may be configured such that the MCU and the IC configure at least a part of a circuit for controlling driving of a motor.

According to one aspect of the disclosure, noise oscillations caused by communication on the same system may be reduced.

DESCRIPTION OF THE EMBODIMENTS

The embodiments of the disclosure will be described below with reference to the drawings. In the following embodiment, the communication method in the control device according to the disclosure will be described using the case in which the method is executed in an exemplary control device according to the disclosure shown in FIG. 1.

(Configuration of Device)

Figure 1:
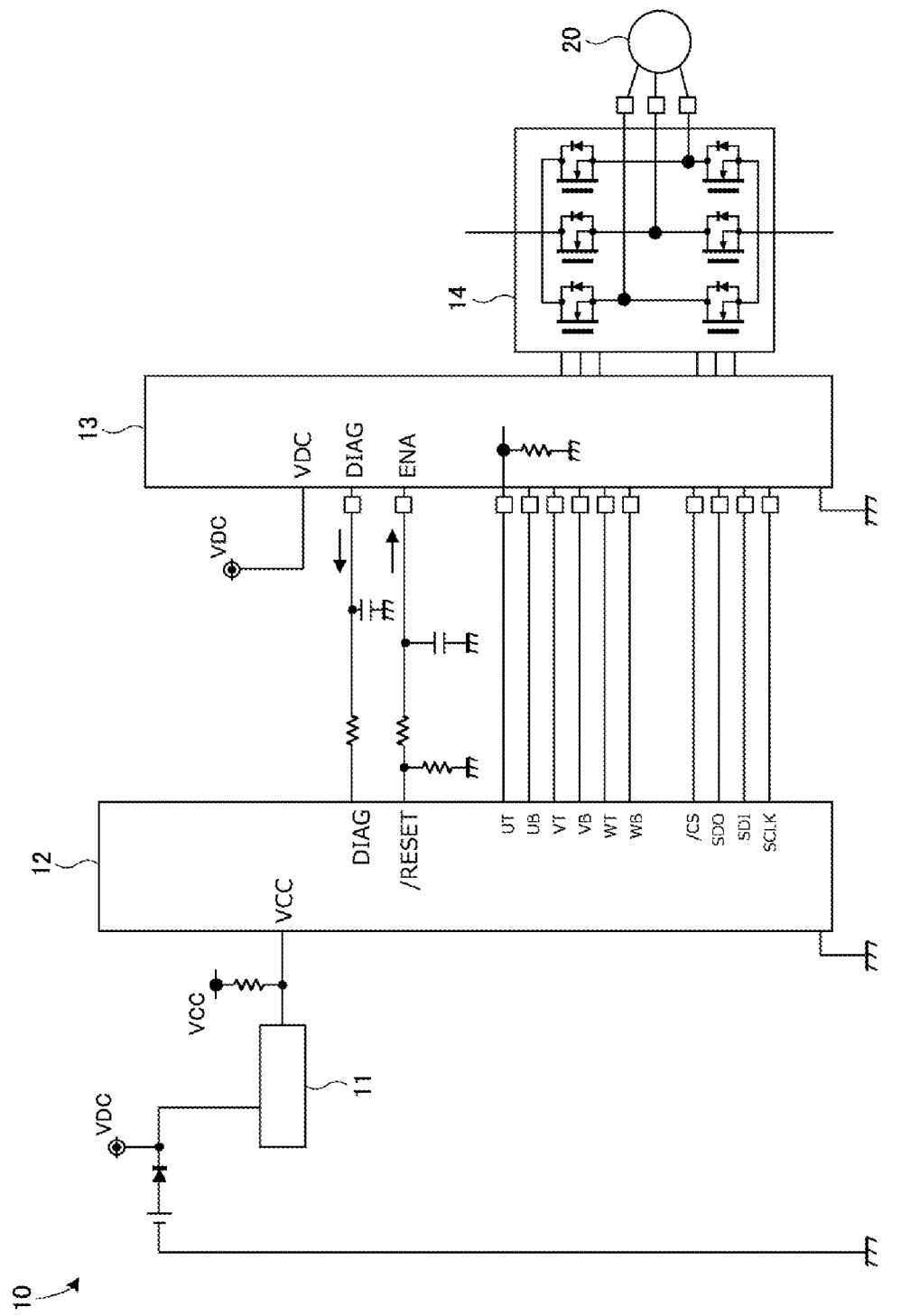
FIG. 1 is a block diagram showing an example of the configuration of the motor control device according to the embodiment of the disclosure, in which the communication method in the motor control device according to the embodiment of the disclosure is executed.

FIG. 1 is a block diagram showing an example of the configuration of the motor control device 10 according to the embodiment, in which the communication method in the motor control device according to the embodiment is executed, as an example of the specific configuration aspect of the control device and the communication method in the control device according to the disclosure.

The motor control device 10 according to the embodiment is a mechanism for controlling the driving of a three-phase AC motor 20 (three phases: U phase, V phase, and W phase) mounted on a vehicle. Specifically, the three-phase AC motor 20 is a motor that drives an electric oil pump that circulates oil. Here, devices and circuits (i.e., control device in the disclosure) to which the communication method in the control device of the disclosure may be applied are not limited to devices and circuits for controlling the driving of motors, and the motor control device 10 shown in FIG. 1 is only one example of a device or circuit to which the communication method in the control device of the disclosure may be applied, so a detailed description is omitted, but the outline is as follows.

The motor control device 10 includes a power supply circuit 11, an MCU (micro controller unit) 12, a predriver 13, and a FET (field effect transistor) bridge 14.

The power supply circuit 11 generates direct current power supply voltage VCC and VDC. The direct current power supply voltage VCC is the power supply voltage (power supply potential) for the MCU 12, and is supplied to the terminal VCC of the MCU 12. The direct current power supply voltage VDC is the power supply voltage (driving voltage) for driving the inverter of the three-phase AC motor 20, and is supplied to the terminal VDC of the predriver 13.

The MCU 12 is, for example, configured as a chip including a CPU (central processing unit), a memory, etc. The CPU of the MCU 12 is configured to read programs and data stored in the memory and perform predetermined processing.

The MCU 12 generates control signals UT, UB, VT, VB, WT, and WB and supplies the same to the predriver 13. The control signals UT and UB are signals for controlling ON/OFF of the switching element related to the U phase in the FET bridge 14. The control signals VT and VB are signals for controlling ON/OFF of the switching element related to the V phase in the FET bridge 14. The control signals WT and WB are signals for controlling ON/OFF of the switching element related to the W phase in the FET bridge 14.

The predriver 13 corresponds to a driving circuit for driving the switching element in the FET bridge 14, and is configured by an IC (integrated circuit). The predriver 13 supplies the signal for controlling each of the switching elements generated according to the control signals UT, UB, VT, VB, WT, and WB supplied from the MCU 12 to the control terminal of each of the switching elements of the FET bridge 14 via six output terminals. That is, the predriver 13 controls the switching operation (i.e., ON/OFF) of the six switching elements in the FET bridge 14 based on the control signals UT, UB, VT, VB, WT, and WB supplied from the MCU 12.

The FET bridge 14 drives the three-phase AC motor 20 by the inverter according to the signal for controlling the switching operation (i.e., ON/OFF) of the six switching elements supplied from the predriver 13 through the six input terminals. The FET bridge 14 is provided with six switching elements for driving the three-phase AC motor 20 by the inverter, specifically, three upper arm (high side) switching elements located at the upper side of the bridge circuit and three lower arm (low side) switching elements located at the lower side of the bridge circuit are provided. Each of the switching elements is configured by a field effect transistor (FET). The three output terminals of the FET bridge 14 are connected to the three coils (i.e., U-phase coil, V-phase coil, and W-phase coil; not shown in the figure) of the three-phase AC motor 20, respectively.

The MCU 12 and the predriver 13 execute communication, and specifically, for example, execute SPI (serial peripheral interface) communication. In the example shown in FIG. 1, four-wire SPI communication is executed with the MCU 12 as the SPI main (or SPI master) and the predriver 13 as the SPI sub node (or SPI slave).

In this case, as the communication signals, a signal /CS for chip selection (/ represents—added above CS), a signal SDI for main output-sub node input, and a clock signal SCLK generated by the MCU 12 for synchronizing the communication are transmitted from the MCU 12 as the SPI main to the predriver 13 as the SPI sub node. Further, a signal SDO for main input-sub node output is transmitted from the predriver 13 as the SPI sub node to the MCU 12 as the SPI main.

The signal SDI for main output-sub node input is data from the MCU 12 (SPI main) to the predriver 13 (SPI sub node) for controlling the switching operation of the six switching elements in the FET bridge 14 in the predriver 13. The signal SDO for the main input-sub node output is data from the predriver 13 (SPI sub node) to the MCU 12 (SPI main).

Furthermore, a diagnostic signal DIAG (specifically, a Hi/Lo signal) is input from the predriver 13 to the diagnostic terminal DIAG of the MCU 12. The diagnostic signal DIAG is, for example, an electrical signal corresponding to information (also referred to as "fail information" or "diagnostic information") indicating an abnormality in the three-phase AC motor 20. Furthermore, when the diagnostic signal DIAG is input, the ECU (electronic control unit; not shown in FIG. 1), which is the upper control device of the MCU 12 and the predriver 13, checks the content of the diagnostic signal DIAG, for example, depending on whether the signal is a diagnostic signal (fail information) indicating a minor abnormality or a diagnostic signal (fail information) indicating an abnormality that requires immediate protection, etc., and performs fail-safe processing or other processing or control.

Further, a reset signal /RESET (/ represents—added above RESET) is transmitted from the MCU 12 to an enable terminal ENA of the predriver 13. For example, when restoring the predriver 13 or the three-phase AC motor 20 to the original state, a reset signal /RESET is applied from the MCU 12 to the enable terminal ENA of the predriver 13.

Here, for example, in a system where it is necessary to obtain IC fail information (e.g., information indicating an abnormality of the three-phase AC motor 20 or information indicating an overcurrent, overheat, overvoltage, undervoltage, or watchdog abnormality of the IC) on the MCU 12 side in the event of an abnormality in the mechanism or equipment to be controlled (i.e., three-phase AC motor 20 in this embodiment) by the motor control device 10 or in the event of an abnormality in the IC (i.e., IC corresponding to predriver 13 in this embodiment), the fail information of the IC is obtained by the communication between the MCU 12 and the IC. However, although failures may occur at any time, early detection is necessary. Thus, in order to detect failures at an early stage, which may occur at any time, the communication between the MCU 12 and the IC may be periodically executed to obtain fail information of the IC.

In addition, by configuring the MCU 12 to be able to communicate with the IC (i.e., IC corresponding to the predriver 13 in this embodiment), the settings of the IC may be rewritten and changed as needed to match, for example, the specifications of the mechanism or equipment controlled by the motor control device 10, the specifications of the mechanism or equipment associated with the motor control device 10, or the state under which the system is operating.

However, noise oscillation occurs during communication, and the noise oscillation accompanying communication during system operation may cause electromagnetic interference. Thus, in order to reduce noise oscillation caused by communication, the disclosure limits the timing of executing communication and prohibits unnecessary communication.

(Processing Content)

Figure 2:
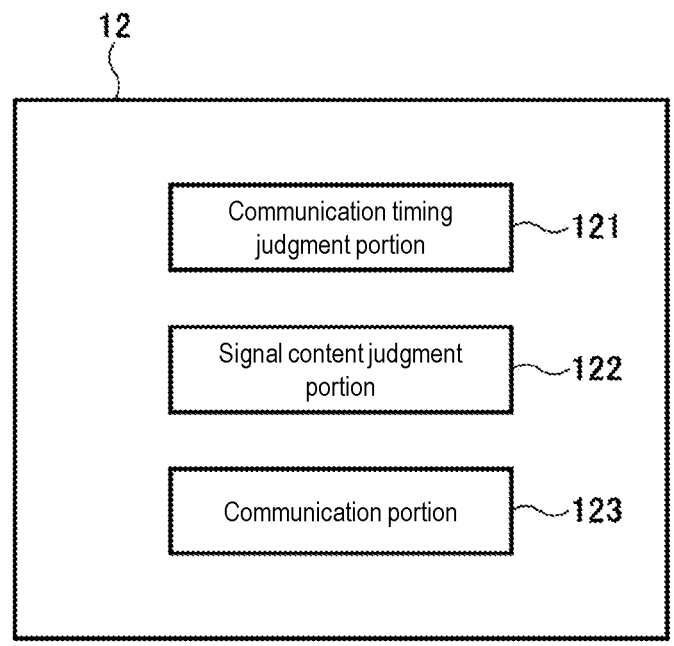
FIG. 2 is a diagram showing the functional configuration of the MCU of the motor control device according to the embodiment.
Figure 3:
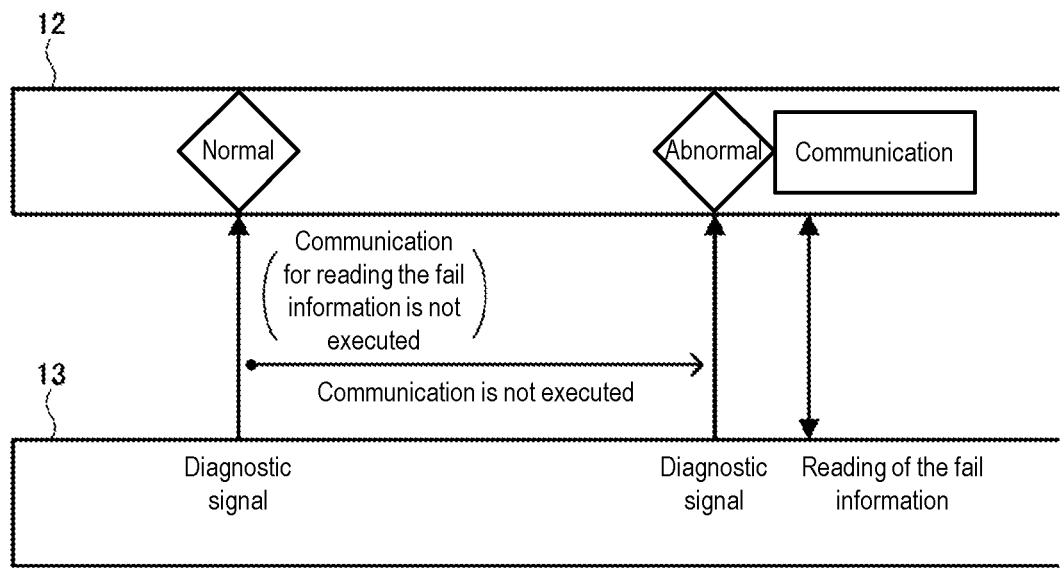
FIG. 3 is a diagram showing the processing content of the motor control device and the communication method in the motor control device according to the embodiment.
Figure 4:
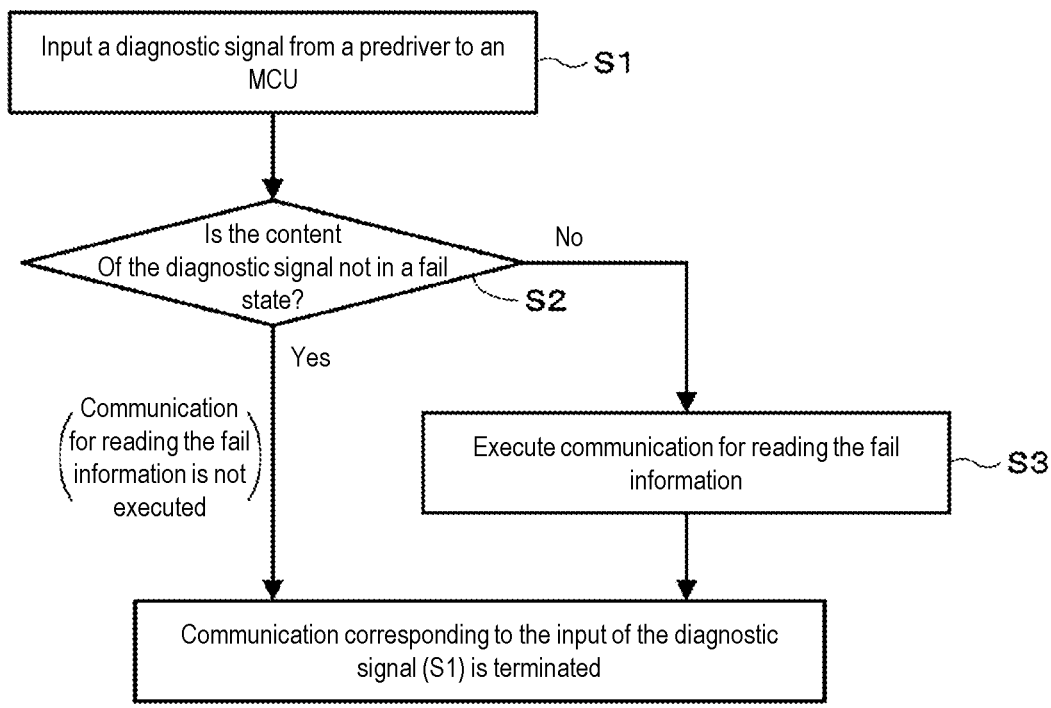
FIG. 4 is a flowchart showing the processing procedure of the motor control device and the communication method in the motor control device according to the embodiment.

FIG. 2 is a diagram showing the functional configuration of the MCU 12 of the motor control device 10 according to the embodiment, as an example of the specific configuration aspect of the control device according to the disclosure. FIG. 3 is a diagram showing the processing content of the motor control device 10 and the communication method in the motor control device according to the embodiment, as an example of the specific configuration aspect of the control device and the communication method in the control device according to the disclosure. FIG. 4 is a flowchart showing the processing procedure of the motor control device 10 and the communication method in the motor control device according to the embodiment.

The motor control device 10 according to the embodiment of the disclosure includes the MCU 12 and the predriver 13 configuring at least a part of a circuit for controlling driving of a motor. The MCU 12 includes a communication timing judgment portion 121, outputting a communication verification command when a diagnostic signal DIAG includes information indicating whether the mechanism or equipment to be controlled by a combination of the MCU 12 and the predriver 13 is in a fail state is input from the predriver 13 to the MCU 12; a signal content judgment portion 122, judging whether a content of the diagnostic signal DIAG is in the fail state when the communication verification command is input and outputting a communication execution command when the content of the diagnostic signal DIAG indicates the fail state; and a communication portion 123, executing a communication between the MCU 12 and the predriver 13 for reading fail information of the predriver 13 when the communication execution command is input.

Further, the communication method in the motor control device according to the embodiment of the disclosure is a method executed by a motor control device including an MCU 12 and a predriver 13, the method includes: a step S2 of judging whether a content of a diagnostic signal DIAG is in a fail state when the diagnostic signal DIAG is input from the predriver 13 to the MCU 12 (step S1), where the diagnostic signal DIAG includes information indicating whether the mechanism or equipment to be controlled by a combination of the MCU 12 and the predriver 13 is in a fail state; and a step S3 of executing a communication between the MCU 12 and the predriver 13 for reading fail information of the predriver 13 when the content of the diagnostic signal DIAG indicates the fail state (step S2: No).

In this embodiment, at the timing when the diagnostic signal DIAG is input from the predriver 13 to the MCU 12, verification is performed to judge whether the communication between the MCU 12 and the predriver 13 is to be executed, and based on the results of the verification, the communication between the MCU 12 and the predriver 13 is executed as necessary to read out the fail information of the predriver 13.

Specifically, first, when a diagnostic signal DIAG is input from the predriver 13 to the communication timing judgment portion 121 of the MCU 12 (step S1), a communication verification command is output from the communication timing judgment portion 121 and input to the signal content judgment portion 122 of the MCU 12, and the signal content judgment portion 122 judges whether the content of the input diagnostic signal DIAG does not indicate a fail state (e.g., whether the state of the three-phase AC motor 20 is normal or abnormal) (step S2).

The signal used in the disclosure as a trigger for starting the verification of whether or not to execute the communication between the MCU 12 and predriver 13 is not limited to the signal referred to as a "diagnostic signal", and any signal that includes information indicating whether the mechanism or equipment (i.e., the three-phase AC motor 20 in this embodiment) to be controlled by the circuit (in particular, a combination of the MCU 12 and an IC that executes communication with that MCU 12 (i.e., an IC corresponding to the predriver 13 in this embodiment)) is in the fail state may be used. That is, the signal used in the disclosure as the trigger for starting the verification of whether or not to execute the communication between the MCU 12 and predriver 13 is, in particular, any signal that includes information indicating whether the mechanism or equipment to be controlled by the combination of the MCU 12 and the IC that executes communication with that MCU 12 (i.e., an IC corresponding to the predriver 13 in this embodiment) is in the fail state.

Then, when the content of the input diagnostic signal DIAG does not indicate the fail state (step S2: Yes), the communication between the MCU 12 and the predriver 13 for reading the fail information (e.g., information indicating an abnormality in the three-phase AC motor 20) of the predriver 13 is not executed, and the communication between the MCU 12 and the predriver 13 corresponding to the input of one diagnostic signal DIAG (step S1) is terminated. Then, the communication related to reading the fail information is not executed between the MCU 12 and the predriver 13 until the next time the content of the diagnostic signal DIAG indicates the fail state.

On the other hand, when the content of the input diagnostic signal DIAG indicates the fail state (step S2: No), a communication execution command is output from the signal content judgment portion 122 of the MCU 12 and input to the communication portion 123 of the MCU 12, and the communication between the MCU 12 and the predriver 13 for reading the fail information (e.g., information indicating an abnormality in the three-phase AC motor 20) of the predriver 13 is executed by the communication portion 123 (step S3). As a result, the communication between the MCU 12 and the predriver 13 corresponding to the input of one diagnostic signal DIAG (step S1) is terminated. Then, the communication related to reading the fail information is not executed between the MCU 12 and the predriver 13 until the next time the content of the diagnostic signal DIAG indicates the fail state.

In addition, after the communication for reading the fail information is executed (step S3) and the content of the fail information of the predriver 13 is confirmed, the ECU executes fail-safe processing or executes other processing or control as necessary.

(Effect)

According to the motor control device 10 and the communication method in the motor control device in the embodiment, in particular, since the timing of executing communication for reading the fail information of the predriver 13 is limited and unnecessary communication is prohibited. the frequency of noise oscillation may be reduced and the circumstances in which noise oscillation occurs may be limited, thereby reducing noise oscillation caused by communication on the same system and reducing the occurrence of adverse effects on electronic equipment due to electromagnetic interference.

Although the embodiment of the disclosure has been described above, the specific configuration aspects of the disclosure are not limited to the above embodiment, and the disclosure also includes embodiments in which variations, changes, etc. are added to the above embodiments to the extent not departing from the spirit of the disclosure.

For example, in the above embodiment, although the motor control device 10 is configured as a mechanism for controlling the driving of the three-phase AC motor 20 mounted in the vehicle (in other words, the MCU 12 and the predriver 13 configure at least a part of the circuit for controlling the driving of the motor), and communication is executed between the MCU 12 and the predriver 13, object to be controlled by the device according to the disclosure is not limited to a motor, and the communication partner of the MCU 12 is not limited to the predriver 13. That is, the other party that communicates with the MCU 12 may be any type of IC.

Furthermore, in the above embodiment, although the MCU 12 and the predriver 13 (i.e., one IC) communicate with each other, the number of ICs that communicate with the MCU 12 is not limited to one, and may be two or more.

Furthermore, in the above embodiment, although SPI communication is performed between the MCU 12 and the predriver 13, the type and standard of the communication executed between the MCU 12 and the predriver 13 is not limited to SPI communication, and other types and standards of communication may be executed between the MCU 12 and the predriver 13.

What is claimed is:

1. A control device, comprising an MCU and an IC, wherein
the MCU comprises:
    a communication timing judgment portion, outputting a communication verification command when a signal comprises information indicating whether an object to be controlled by a combination of the MCU and the IC is in a fail state is input from the IC to the MCU;
    a signal content judgment portion, judging whether a content of the signal is in the fail state when the communication verification command is input and outputting a communication execution command when the content of the signal indicates the fail state; and
    a communication portion, executing a communication between the MCU and the IC for reading fail information of the IC when the communication execution command is input.

2. The control device according to claim 1, wherein the MCU and the IC configure at least a part of a circuit for controlling driving of a motor.

3. A communication method in a control device, which is a method executed by a control device comprising an MCU and an IC, the method comprising:
    a step of judging whether a content of a signal is in a fail state when the signal is input from the IC to the MCU, wherein the signal comprises information indicating whether an object to be controlled by a combination of the MCU and the IC is in a fail state; and
    a step of executing a communication between the MCU and the IC for reading fail information of the IC when the content of the signal indicates the fail state.

4. The communication method in the control device according to claim 3, wherein the MCU and the IC configure at least a part of a circuit for controlling driving of a motor.

* * * * *